United States Patent [19]
Sato

[11] Patent Number: 5,602,678
[45] Date of Patent: Feb. 11, 1997

[54] DATA IMPRINTING APPARATUS

[75] Inventor: Hiroshi Sato, Tokyo, Japan

[73] Assignee: Canon Kabushiki Kaisha, Tokyo, Japan

[21] Appl. No.: 273,322

[22] Filed: Jul. 11, 1994

[30] Foreign Application Priority Data

Jul. 12, 1993 [JP] Japan .................. 5-195129

[51] Int. Cl.⁶ .................. G02B 27/10; G02B 27/14
[52] U.S. Cl. .................. 359/618; 359/629
[58] Field of Search .................. 359/629, 634, 359/619, 638, 637, 639

[56] References Cited

U.S. PATENT DOCUMENTS

| | | | |
|---|---|---|---|
| 3,403,262 | 9/1968 | Seidel | 359/618 |
| 3,680,961 | 8/1972 | Rudd | 356/102 |
| 4,690,549 | 9/1987 | Nakada | 356/4 |
| 4,696,061 | 9/1987 | Labrum | 359/618 |
| 5,001,333 | 3/1991 | Marshall | 250/201.5 |
| 5,164,578 | 11/1992 | Witthoft | 250/201.9 |

FOREIGN PATENT DOCUMENTS 3-84820  8/1991  Japan.

*Primary Examiner*—George Y. Epps
*Assistant Examiner*—Ricky Mack
*Attorney, Agent, or Firm*—Fitzpatrick, Cella, Harper & Scinto

[57] ABSTRACT

There is disclosed a data imprinting apparatus which includes light source means for forming data, light splitting means for splitting light emitted from the light source means, first optical means for guiding one light beam split by the light splitting means onto a first area of the photosensitive surface, and second optical means for guiding the other light beam split by the light splitting means onto a second area of the photosensitive surface, and which can achieve proper data display states in correspondence with different phototaking modes with different phototaking areas.

4 Claims, 2 Drawing Sheets

DATA IMPRINTING APPARATUS

BACKGROUND OF THE INVENTION

1. Field of the Invention

The present invention relates to a camera having a data imprinting apparatus and, more particularly, to a camera having a data imprinting apparatus suited for, e.g., a lens shutter camera, which imprints data such as a date in different areas of a film in correspondence with phototaking states upon execution of a switching exposure operation onto a film in, e.g., a normal phototaking state (first phototaking state) with a full size, a panoramic phototaking state (second phototaking state) with a laterally elongated size, and the like.

2. Related Background Art

Conventionally, various cameras which have data back apparatuses which can simultaneously imprint data such as a date on a portion of a film upon execution of an exposure operation of an object image onto a film have been proposed.

On the other hand, as recent 35 mm film cameras, various cameras, which can perform a so-called panoramic phototaking operation with a laterally elongated size (e.g., an aspect ratio of 9/16 by partially trimming a phototaking frame (e.g., by cutting upper and lower portions of the frame) as well as a normal phototaking operation for exposing an object image on the entire 24×36 mm full-size area, have been proposed.

In such cameras, when data such as a date is imprinted on a portion of a film, the data can be imprinted in terms of the frame in the normal phototaking mode, but cannot often be imprinted in the panoramic phototaking mode since the frame is laterally elongated.

Contrary to this, Japanese Laid-Open Utility Model Application No. 3-84820 proposes a camera which has a data imprinting apparatus for selectively imprinting data on different areas of a film using a reflection member in correspondence with a phototaking state.

In the data imprinting apparatus proposed by Japanese Laid-Open Utility Model Application No. 3-84820, upon execution of the switching exposure operation onto a film between the normal phototaking mode and the panoramic phototaking mode, data is imprinted on different areas of a film by rotating the reflection member.

For this reason, durability associated with rotation of the reflection member poses a problem. In addition, no countermeasure is taken against the data imprinting magnification in the panoramic phototaking mode, and the size of data becomes unbalanced with respect to that of the phototaking frame.

SUMMARY OF THE INVENTION

It is an object of the present invention to provide a camera having a data imprinting apparatus which can accurately imprint data such as a date on different areas of a film at a predetermined magnification upon execution of an exposure operation of an object image by switching a phototaking mode between a normal phototaking mode (first phototaking state) and a panoramic phototaking mode (second phototaking state), while simplifying a mechanical element for changing the optical path.

DETAILED DESCRIPTION OF THE PREFERRED EMBODIMENTS

Figure 1:
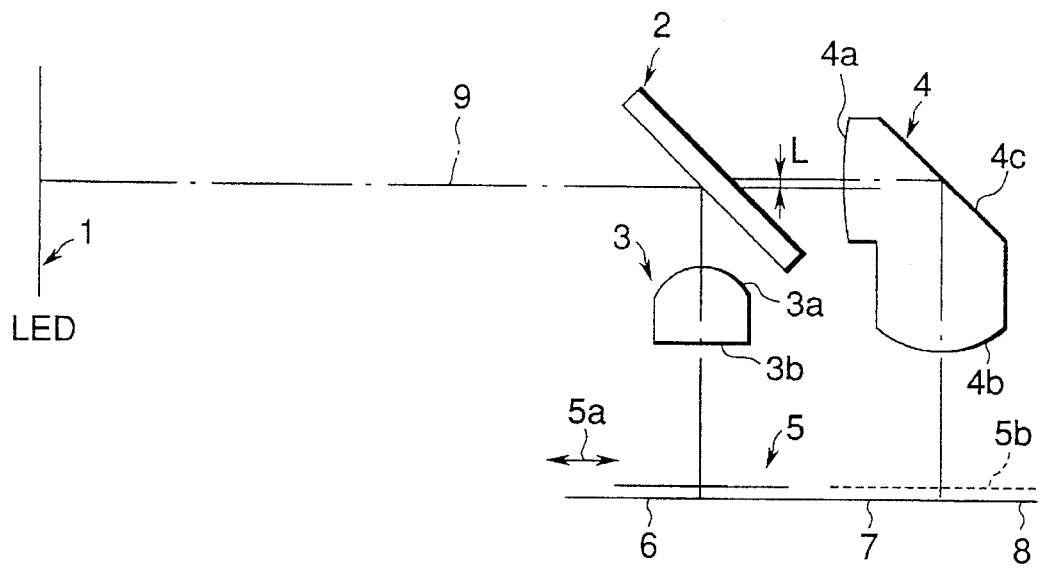
FIG. 1 is a schematic view showing the principal part of an optical system according to the first embodiment of the present invention.

FIG. 1 is a schematic view showing the principal part of an optical system according to the first embodiment of the present invention.

Referring to FIG. 1, a data display unit 1 comprises a large number of LED elements for displaying information such as a date.

An optical path splitting means 2 comprises, e.g., a half mirror, and splits a light beam from the data display unit 1 into two light beams, i.e., transmitted and reflected light beams. First and second lenses 3 and 4 are respectively arranged along the two optical paths of the optical path splitting means 2. The second lens 4 comprises a glass block having entrance and exit surfaces 4a and 4b each having a refracting power, and an internal reflection surface 4c.

A photosensitive surface 8 comprises, e.g., a film in a phototaking camera. The photosensitive surface 8 has first and second areas 6 and 7. A light-shielding plate 5 is reciprocally moved in a plane parallel to the photosensitive surface 8, as indicated by an arrow 5a in FIG. 1', and selectively records data from the data display unit 1 on the first or second area 6 or 7. Note that in a data imprinting operation on a film, data is formed by turning on/off the LED elements in synchronism with a feeding operation of the film.

The above-mentioned elements constitute part of a data imprinting system.

In this embodiment, when, for example, a 35 mm film is used as the photosensitive surface 8, and when a normal phototaking mode (first phototaking state) for exposing an object image formed by a phototaking lens (not shown) on the entire frame is to be executed, the light-shielding member 5 is moved to and stopped at a position 5b indicated by a dotted line by a switching means.

Upon execution of the exposure operation of the object image onto the film surface 8, a light beam emitted by the data display unit 1 and reflected by the optical path splitting means 2 is guided onto the first area 6 via the first lens 3, and an optical image from the data display unit 1 is focused and exposed on the surface of the first area 6.

On the other hand, in a panoramic phototaking mode (second phototaking state) in which the frame of the film 8 is used as a laterally elongated frame by trimming a predetermined area, in the vertical direction, of the effective frame of the film 8, the light-shielding member 5 is moved to and stopped at a position 5b indicated by a solid line by the switching means.

Upon execution of the exposure operation of the object image onto the film surface 8, a light beam emitted by the data display unit 1 and transmitted through the optical path splitting means 2 is guided onto the second area 7 via the second lens 4, and an optical image from the data display unit 1 is focused and exposed on the surface of the second area 7.

In this embodiment, since the half mirror 2 as the optical path splitting means is arranged to be inclined through 45° with respect to an optical axis 9, a light beam transmitted through the half mirror 2 is shifted by a distance L. In this case, it is desirable that the optical axis of the lens 4 be caused to coincide with the optical path by shifting it by the distance L corresponding to the shift of the optical path.

In this embodiment, the distance L at this time is set to satisfy 0.3d<L<0.6d. Note that d is the thickness of the half mirror 2.

When the distance L increases beyond the upper limit of the above condition, the thickness of the half mirror becomes too large, and this results in deterioration of image performance, in particular, generation of a considerable astigmatism. On the other hand, when the distance L decreases below the lower limit of the above condition, the thickness of the half mirror 2 becomes too small, and this undesirably results in an increase in manufacturing or assembling cost.

In this embodiment, the imaging magnification of data from the data display unit 1 in the panoramic phototaking mode is set to be smaller than that in the normal phototaking mode in consideration of the feature of the panoramic phototaking mode.

Figure 3A:
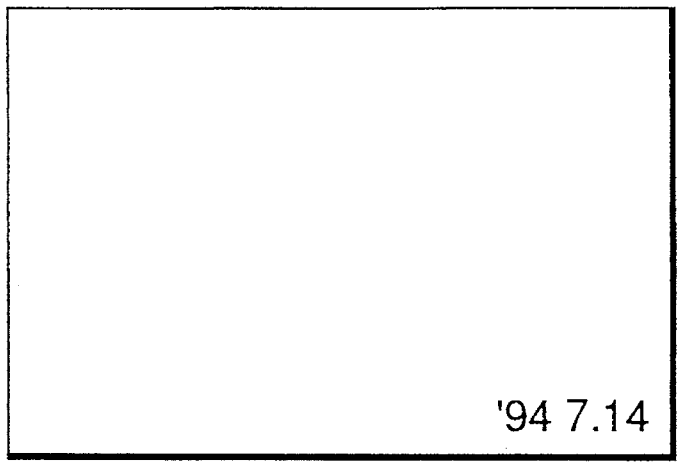
FIGS. 3A and 3B are views showing two display states of the present invention.
Figure 3B:
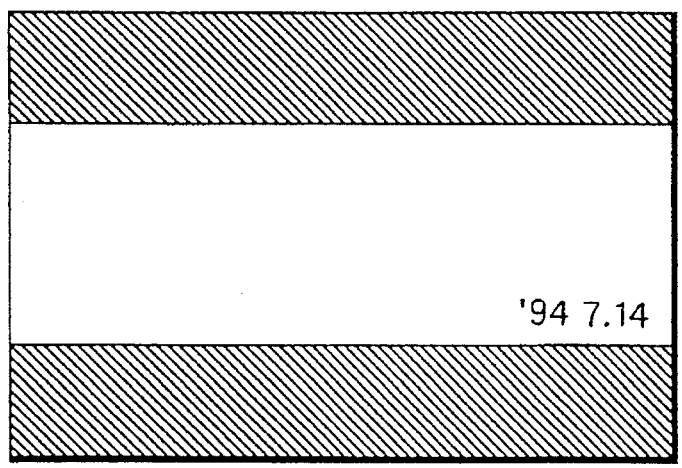

In this embodiment, data from the data display unit 1 is imaged at a lateral magnification of ×¼ in the normal phototaking mode, and is imaged at a magnification of ×⅕ in the panoramic phototaking mode. Although a taken image is printed while being enlarged in a larger scale in the panoramic phototaking mode than that in the normal phototaking mode, the printed data in both the modes can have substantially the same sizes. FIGS. 3A and 3B show these display states. Note that the half mirror 2 to be used has a reflectance (50%) substantially equal to its transmittance (50%).

On the other hand, an aperture φ1 of a lens surface 3a, on the side of the data display unit 1, of the first lens 3 is set to be φ1=1.2 mm, and an aperture φ2 of a lens surface 4a, on the side of the data display unit 1, of the second lens 4 is set to be φ2=1.0 mm, so that effective T-numbers upon execution of the data imprinting operation in both the normal and panoramic phototaking modes become substantially equal to each other.

In this embodiment, in order to decrease the phototaking magnification in the panoramic phototaking mode, as described above, the lens surfaces of the first and second lenses are formed to satisfy:

$|R_{1f}|<|R_{2f}|$ $|R_{2r}|<|R_{1r}|$ for $R_{1a}>0$ and $R_{2b}>0$
where $R_{1f}$ and $R_{1r}$ are the radii of curvature of the lens surfaces, respectively on the sides of the data display unit and the photosensitive surface, of the first lens, and $R_{2f}$ and $R_{2r}$ are the radii of curvature of the lens surfaces, respectively on the sides of the data display unit and the photosensitive surface, of the second lens.

These conditions are those for maintaining the magnifications of the lenses to be predetermined values while the interval between each rear-side lens surface and the photosensitive surface is separated by a predetermined distance. An imprinting magnification M is given by:

$$M = \left| \frac{S_k}{S_1} \right|$$

where $S_1$ is the principal point interval between the object-side principal point of an imaging lens and the data display unit, and $S_k$ is the principal point interval between the image-side principal point of the imaging lens and a film.

Therefore, in order to decrease the imprinting magnification M in the phototaking operation, $|S_k|$ or $|S_1|$ must be increased. When $|S_1|$ is increased, the optical system is brought close to the data display unit, and it is not preferable since the size of the entire optical system increases. For this reason, the magnification M is decreased by decreasing $|S_k|$, e.g., by making the rear-side curved surface of the second lens 4 for the panoramic phototaking mode to be stronger than that of the first lens 3 for the normal phototaking mode.

Figure 2:
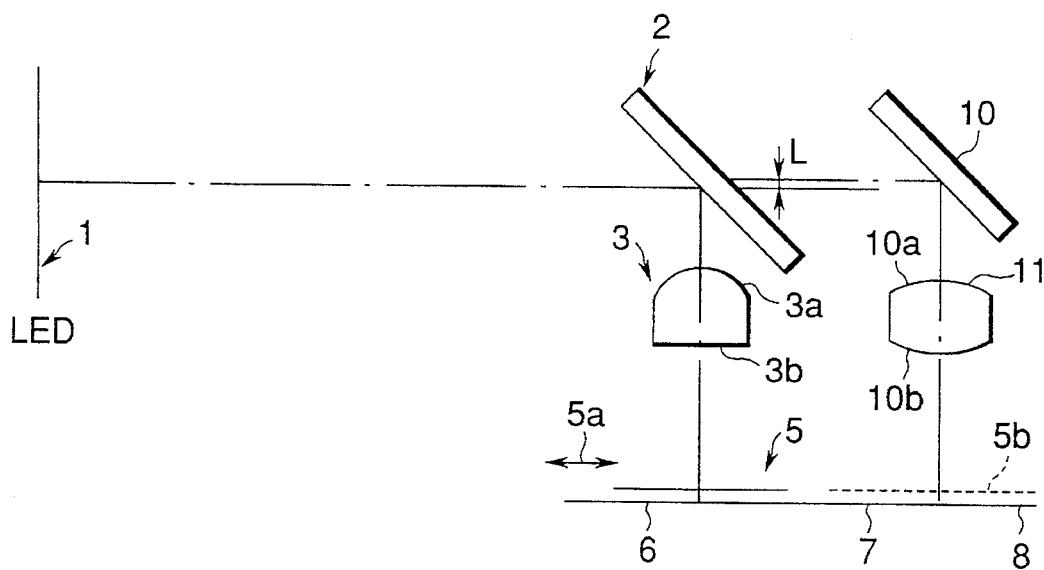
FIG. 2 is a schematic view showing the principal part of an optical system according to the second embodiment of the present invention.

FIG. 2 is a schematic view showing the principal part of an optical system according to the second embodiment of the present invention. The same reference numerals in FIG. 2 denote the same parts as in the first embodiment shown in FIG. 1.

The arrangement of this embodiment is substantially the same as that in the first embodiment shown in FIG. 1, except that a mirror 10 and a second lens 11 are used in place of the second lens 4 which has both the imaging and reflection functions.

Numeric examples of the first and second lenses of the present invention will be presented below. In each numeric example, Ri is the radius of curvature of an i-th lens surface in turn from the data display unit 1 side, Di is the lens thickness and air gap of the i-th lens from the data display unit 1 side, and Ni and νi are respectively the refractive index and Abbe's number of glass of the i-th lens in turn from the data display unit 1.

If the optical axis direction is defined as an X axis, the direction perpendicular to the optical axis is defined as an H axis, the propagation direction of light is defined as a positive direction, R is the paraxial radius of curvature, and A, B, C, D, and E are aspherical coefficients, the aspherical shape is given by:

$$X = \frac{(1/R)H^2}{1 + \sqrt{1-(H/R)^2}} + AH^2 + BH^4 + CH^6$$

(Numeric Example 1)

First Lens

R1 = 2.09   D1 = 1.4   N1 = 1.58306   ν1 = 30.23
R2 = −4.59
B = −1.03 × 10⁻²
C = −1.60 × 10⁻²

Second Lens

R1 = 6.96   D1 = 4.65   N1 = 1.58306   ν1 = 30.23
R2 = −1.65
B = 3.23 × 10⁻²
C = 1.28 × 10⁻²

(Numeric Example 2)

First Lens:   the same as in Numeric Example 1
Second Lens

R1 = 2.24   D1 = 1.4   N1 = 1.58306   ν1 = 30.23
R2 = −4.00
B = −7.52 × 10⁻³
C = 8.87 × 10⁻²

According to the present invention, when the respective elements are set, as described above, the camera having a data back apparatus, which can accurately imprint data such as a date on different areas of a film at a predetermined magnification upon execution of an exposure operation of an object image by switching a phototaking mode between a normal phototaking mode (first phototaking state) and a panoramic phototaking mode (second phototaking state), while simplifying a mechanical element for changing the optical path, can be realized.

What is claimed is:

1. An apparatus for imprinting data onto a photosensitive surface, comprising:

light source means for forming data;

light splitting means for splitting light emitted from said light source means into a first light beam and a second light beam;

first optical means, including a first lens, for guiding the first light beam split by said light splitting means onto a first area of the photosensitive surface; and second optical means, including a second lens, for guiding the second light beam split by said light splitting means onto a second area, different from the first area, of the photosensitive surface, wherein when radii of curvature of lens surfaces, on the sides of said light source means and the photosensitive surface, of said first lens are respectively represented by $R_{1f}$ and $R_{1r}$, and radii of curvature of lens surfaces, on the sides of said light source means and the photosensitive surface, of said second lens are respectively represented by $R_{2f}$ and $R_{2r}$, the following conditions are satisfied:

$$|R_{1f}|<|R_{2f}|$$

$$|R_{2r}|<|R_{1r}|.$$

2. An apparatus for imprinting data onto a photosensitive surface, comprising:

light source means for forming data;

light splitting means for splitting light emitted from said light source means into a first light beam and a second light beam;

first optical means for guiding the first light beam split by said light splitting means onto a first area of the photosensitive surface; and second optical means for guiding the second light beam split by said light splitting means onto a second area, different from the first area, of the photosensitive surface, wherein said first and second optical means mutually have different imaging magnifications.

3. An apparatus for imprinting data onto a photosensitive surface, comprising:

light source means for forming data;

light splitting means for splitting light emitted from said light source means into a first light beam and a second light beam;

first optical means for guiding the first light beam split by said light splitting means onto a first area of the photosensitive surface;

second optical means for guiding the second light beam split by said light splitting means onto a second area, different from the first area, of the photosensitive surface, wherein the data to be formed on the first and second areas of the photosensitive surface mutually have different sizes.

4. An apparatus for imprinting data onto a photosensitive surface, comprising:

light source means for forming data;

light splitting means for splitting light emitted from said light source means into a first light beam and a second light beam;

first optical means for guiding the first light beam split by said light splitting means onto a first area of the photosensitive surface;

second optical means for guiding the second light beam split by said light splitting means onto a second area, different from the first area, of the photosensitive surface; and light shielding means for shielding light reaching the second area while light is introduced to the first area.

* * * * *

UNITED STATES PATENT AND TRADEMARK OFFICE
CERTIFICATE OF CORRECTION

PATENT NO.　：　5,602,678
DATED　　　　：　February 11, 1997
INVENTOR(S)：　HIROSHI SATO

It is certified that error appears in the above-indentified patent and that said Letters Patent is hereby corrected as shown below:

COLUMN 2

Line 29, "FIG. 1'," should read --FIG. 1,--.

Signed and Sealed this

Twenty-fourth Day of June, 1997

Attest:

BRUCE LEHMAN

*Attesting Officer*　　　*Commissioner of Patents and Trademarks*